United States Patent [19]

Nordstrom et al.

[11] Patent Number: 5,983,292
[45] Date of Patent: Nov. 9, 1999

[54] MESSAGE TRANSPORT MECHANISMS AND METHODS

[75] Inventors: Gregory Michael Nordstrom, Oronoco; Shawn Michael Lambeth, Pine Island; Paul Edward Movall, Rochester; Daniel Frank Moertl, Rochester; Charles Scott Graham, Rochester; Thomas Rembert Sand, Rochester, all of Minn.

[73] Assignee: International Business Machines Corporation, Armonk, N.Y.

[21] Appl. No.: 08/950,593

[22] Filed: Oct. 15, 1997

[51] Int. Cl.$^6$ ............... G06F 13/10; G06F 13/14
[52] U.S. Cl. ............... 710/54; 710/52; 709/301; 711/154; 711/203
[58] Field of Search ............... 711/154, 203; 709/301; 710/1, 52, 54

[56] References Cited

U.S. PATENT DOCUMENTS 5,163,154  11/1992  Bournas et al. .................. 395/775
5,386,552   1/1995  Garney ........................... 395/575
5,519,833   5/1996  Agranat et al. ............... 395/200.03
5,644,575   7/1997  McDaniel ....................... 370/416
5,657,471   8/1997  Lary et al. ..................... 395/481

OTHER PUBLICATIONS

*Inside the AS/400*, Chapter 10, pp. 253–275, by Frank Soltis, Duke Press, Loveland, Colorado, 1996.
"PCI Local Bus Specification," Product Version, Revision 2.1, Jun. 1, 1995, pp. 1–282.
IBM Technical Disclosure Bulletin, vol. 39, No. 01, Jan. 1996, pp. 339–351, "Method for Atomic Peer–to–Peer Communication on a Peripheral Component Interconnect Bus".

Primary Examiner—Thomas C. Lee
Assistant Examiner—Rehana Perveen
Attorney, Agent, or Firm—Birch, Stewart, Kolasch & Birch; Michael Mutter

[57] ABSTRACT

An I/O system including a processor complex and system main memory connected to I/O adapters via I/O adapters and I/O bus. A message transport mechanism and method stores an upstream message queue and a downstream message queue in system main memory. Queue addresses are stored both in system main memory and designated registers of I/O adapters. The I/O adapters utilize the queue addresses to manage the transfer of downstream command messages and to send upstream response messages to the system main memory via direct memory access across the I/O bus.

16 Claims, 11 Drawing Sheets

MTM Registers 280

| Register | |
|---|---|
| Downstream Queue Parameter Register (DQPR) | 275 |
| Downstream Queue Device Address Register (DQDAR) | 271 |
| Downstream Queue System Address Register (DQSAR) | 272 |
| Downstream Device Address Shadow Address Register | 276 |
| Downstream Queue Base Address Register (DQBAR) | 277 |
| Downstream Queue Limit Address Register (DQLAR) | 278 |
| Upstream Queue Parameter Register (UQPR) | 285 |
| Upstream Queue Device Address Register (UQDAR) | 281 |
| Upstream Queue System Address Register (UQSAR) | 282 |
| Upstream Device Address Shadow Address Register | 286 |
| Upstream Queue Base Address Register (UQBAR) | 287 |
| Upstream Queue Limit Address Register (DQLAR) | 288 |

FIGURE 5

MESSAGE TRANSPORT MECHANISMS AND METHODS

CROSS REFERENCE TO RELATED APPLICATION

The present invention is related to Ser. No. 08/950,755, filed on Oct. 15, 1997 (now pending), entitled "Interrupt and Message Batching Apparatus and Method," the specification of which is hereby incorporated by reference. The present invention is also related to Ser. No. 08/951,157, filed on Oct. 15, 1997 (now pending), entitled "Interrupt Mechanisms and Methods," the specification of which is also hereby incorporated by reference.

BACKGROUND OF THE INVENTION

1. Technical Field of the Invention

This invention relates generally to computer systems and, more particularly, the invention relates to I/O (input/output) message transport mechanisms and methods.

2. Description of Related Art

Computer input/output (I/O) protocols govern communications between computer operating system programs and computer I/O devices, such as I/O devices that provide disk storage, communications or network capabilities. Conventionally, these I/O protocols are based upon command and response messages that are exchanged on an I/O bus that interconnects the computer central processor and memory to I/O device adapters or I/O processors. An I/O processor is a type of an I/O adapter that has more complex functions, usually in support of the operating system programs. An I/O adapter will be considered the broader class of which an I/O processor is included.

In conventional I/O protocols, operating system device driver programs create command messages that are transmitted across an I/O bus to the I/O adapter. The I/O adapter interprets the command and performs the requested operation, usually transferring data between an I/O device connected to the I/O adapter and the main memory across the I/O bus. Data is typically transferred by using known direct memory access mechanisms that are part of the I/O bus functions. When the I/O adapter completes the requested operation, it creates a response message that is retrieved by the central processor to the main memory where the operating system and device driver programs executed by the central processor interpret that response and conclude the overall I/O operation.

Conventional PCI (Peripheral Component Interconnect) bus architectures include a host system with a central processor complex and a main memory connected to a plurality of I/O adapters via a PCI bus. In the general model of conventional PCI buses, the conventional PCI bus architecture does not make any assumptions about the content or type of information exchanged between a host system and an I/O adapter. That is to say the PCI architecture does not define or distinguish the specific communications that occur between the host system and the I/O adapter that use the PCI bus as a transmission medium.

In the PCI specification model, an I/O adapter typically includes a set of memory locations that might collectively be called a register set or a command buffer and a response buffer. The typical PCI host system performs time-expensive memory storing operations to transmit a command via the PCI bus from the host system to a memory location such as the command buffer of an I/O adapter.

In response to the command, the I/O adapter performs the requested operation and then generate a response message to inform the host system of the result and any errors that have occurred. This response message is typically stored in the I/O adapter's response message buffer. The host system must then retrieve the response message and extract protocol information from the retrieved response message to determine the I/O adapter's response to the command. More particularly, the PCI host system reads the response message from an address in a memory of the I/O adapter to retrieve the response message.

One consequence of such a conventional PCI system is that the host system processor experiences latency to store to and load from the PCI I/O adapter memory. The execution of I/O commands by an I/O adapter typically requires a time duration of many thousands, or even millions, of central processor instruction cycles. Thus, while the I/O adapter is performing a command, the device driver and computer operating system normally perform other work and are not waiting for the I/O adapter to complete the command and forward the response message. The device driver and operating system rely upon an asynchronous event indication, such as a processor interrupt, to signal that the I/O adapter has completed the command and that the response message is available for the operating system and device driver to interpret. The relative timing and frequency of these signals, called interrupts, indicating that an I/O command has been completed have significant effects on the overall utilization of the central processor, utilization of the I/O adapter and its data throughput capabilities, and overall system performance. For example, in a large high performance processor system, the latency for an I/O memory read across a conventional PCI bus requiring many processor cycles seriously degrades execution speed of a program depending upon the data read from memory. More particularly, a high performance processor may be latent several hundred or even several thousand processor cycles while one word, i.e., four bytes of data, is read from memory.

The PCI local bus specification potentially alleviates some of these inefficiencies resulting from I/O latencies by setting maximum target latencies which are not to be exceeded by the host system, the bus arbitrator, or the I/O adapter. In practice, however, the PCI bus has a minimum latency on the order of 33 to 66 MHz so there are still minimum latencies of several microseconds. Furthermore, the maximum target latencies that the PCI standard expects are typically on the order of many to several hundred microseconds. Realistically, for a slow I/O adapter the maximum latency could even be one or more milliseconds. The penalty to a high performance processor running with, for example, a seven nanosecond cycle time, is that, even at minimum expected latencies on a PCI bus, the processor is facing several hundred to several thousand cycles of time delay.

To optimize central processor utilization, conventional systems typically attempt to minimize the number of processor instruction cycles required to recognize the completion event and communicate this event to the I/O device driver. To optimize I/O adapter throughput, conventional systems also attempt to minimize the time between the completion of one I/O command and the start of the next I/O command. To optimize overall system performance, in relation to programs that require I/O, conventional systems also minimize the latency of an I/O operation, as measured from the time that the command is created until the time that the response has been interpreted and the results are available to the program that caused or required the I/O, for example, an "OPEN FILE" function that requires a disk read operation to get information about the location of the requested file.

Conventional I/O adapter protocols also employ both command and response queues located in the computer main memory, I/O adapter memory or registers, or a combination of both. Command queues enable the device driver to create new commands while the I/O adapter executes one such command. Response queues enable the I/O adapter to signal the completion of previous commands and proceed to new commands without waiting for the device driver or operating system to recognize and interpret the completion of these previous commands.

Similarly, computer systems generally include a processor interrupt mechanism which the I/O adapter uses to signal completion of a command and notify the processor that a response message has been placed on the response queue. The interrupt mechanism provides a signal line from the I/O adapter to the processor that, when asserted, asynchronously interrupts the central processor and switches processor execution from its current program to an operating system or device driver program designed to interpret the interrupt event. While this interrupt mechanism can minimize the latency associated with the completion of an I/O command and interpretation of the response message, switching the processor execution from its current program to an interrupt program requires a processor context switch that requires many instruction cycles. This context switch saves the current program's critical information such as selected processor registers and state information and loads the interrupt program's critical information. When the interrupt program completes its immediate work and is ready for the processor to resume the original program, there is a second context switch to restore the critical information of the original program to resume execution. Each context switch consumes valuable processor time. Conventional systems interrupt the processor every time an I/O event has completed, so context switches cause processor inefficiency.

Furthermore, in PCI buses on personal computers and desktop platforms, an I/O command is performed via a memory mapped I/O storing process which moves the command from the host system to a buffer in the I/O adapter. This I/O storing process includes the host system storing a command in a control register of the I/O adapter and loading from the I/O hardware to complete all stores to the I/O adapter and to verify that no errors occurred. The I/O adapter moves the data between the I/O adapter and the PCI device adapter memory, and utilizes a direct memory access to transfer the data between PCI adapter memory and the host system memory. The form of notification that a command has been completed varies on the PCI adapter. A common form is for the I/O adapter to raise a system interrupt line to the host system. In response to the interrupt, the host system software performs a series of loading operations from the PCI adapter to determine the nature of the interrupt.

Loading operations in which data is retrieved from an 1/O adapter or PCI bus hardware require many central processor cycles to retrieve the data because the central processor waits for the loading operation to complete. Storing operations which store commands from the central processor to I/O adapters and PCI bus hardware are not initially expensive in terms of central processor cycles, but the store command may not complete and must either be verified via a loading operation from the same location or a series of loading operations to verify the hardware between the central system processor and the I/O adapter. Storing operations that require verification are commonly referred to as "verified" storing operations. Storing operations that do not require verification and that may be reissued without adverse system effects are referred to as "non-verified" storing operations. Thus, to optimize the overall system performance and minimize processor utilization, it is desirable to avoid expensive loads from I/O adapters and also expensive "verified" stores to I/O adapters.

The normal interrupt mechanism for a PCI adapter is to first create interrupt status in an internal facility or register located within the adapter's memory space. Then the PCI device signals an interrupt to the system. The system, upon receiving the interrupt, first determines which adapter had signalled that interrupt. To make this determination, the system actually looks at all of the I/O adapters that could have potentially signalled such an interrupt unless it knows that the interrupt came from a particular slot and need only look at that one I/O adapter. In response to such an interrupt, the system then reads the memory address in the device specific to that vendor and adapter type. By reading the memory, the system extracts the interrupt status that describes the particular reason for which the device raised the interrupt.

SUMMARY OF THE INVENTION

An object of the invention is to reduce or eliminate the number of times the system processor performs loading and storing operations with I/O adapters. To achieve this object, the present invention stores messages, adapter status, and adapter control information in system main storage.

Another object of the invention is to improve system efficiency by amortizing processor interrupt overhead associated with an I/O adapter, using response message queues that on average contain several device response messages at each interrupt event. This object is achieved by shifting the burden of transferring response messages to the I/O adapter by having the I/O adapter internally store queue addresses which are utilized by the I/O adapter to send response messages via direct memory access to system main storage.

Another object of the invention is to reduce the number of verified store operations to the I/O adapter memory space. The object is achieved by using message queue pointers in the I/O adapter that may be updated in the I/O adapter without relying on mechanisms that verify the success of such a store operation. This object is further achieved by using message queue pointers that are stored to I/O adapter memory space and which may be reissued, without error or ambiguity, anytime that a PCI bus error occurs that may have affected such a storing operation.

Still another object of the invention is to improve command and response message queue structures and queue handling methods. To achieve this object, the present invention expands and improves upon conventional command and response queues by having the central processor utilize local, main memory to access and service the queues and distributing the I/O bus traversal burden to the I/O adapter (s).

Yet another object of the invention is to improve the format of command and response messages to facilitate message transfer and decodation. To achieve this object, the invention discloses encapsulated response messages having a payload format code identifying a format of the response message payload wherein the host system extracts the encapsulated response message payload and processes the extracted response message. The command messages are also encapsulated by the invention and processed by the I/O adapters.

To further achieve the objects of the invention, the invention provides a message transport system transporting messages between a host system connected to an I/O adapter.

There is a downstream queue provided in a memory of the host system, the downstream queue storing a queue of message pointers pointing to command messages generated by the host system and stored in the host system memory. Further, there is a downstream queue system address pointer located in the host system memory pointing to a next downstream queue address at which the host system will store a next message pointer. Also, there is a downstream queue system address register located in the I/O adapter pointing to the next downstream queue address at which the host system will store the next message pointer and a downstream queue device address pointer located in the host system memory pointing to a next downstream queue address from which the I/O adapter will read a next message pointer, a downstream queue device address register located in the I/O adapter pointing to a next downstream queue address from which the I/O adapter will read the next message pointer. A bus interconnects the host system and the I/O adapter. Similarly, the invention provides an upstream queue in the memory of the host system, the upstream queue storing a queue of response messages generated by the I/O adapter when the command message has been processed by the I/O adapter. Also there is an upstream queue system address pointer located in the host system memory pointing to a next response message to be processed by the host system and an upstream queue system address register located in the I/O adapter storing an address of a next response message to be processed by the host system. Likewise, an upstream queue device address pointer located in the host system memory points to a next response message address at which the I/O adapter will store a next response message; and an upstream queue device address register located in the I/O adapter stores an address of the next response message address at which the I/O adapter will store a next response message.

To still further achieve the objects of the invention, there is disclosed an I/O system, including: a processor complex having a processing unit capable of switching context between an I/O adapter handling state and an application program handling state. The system has a main memory connected to the processing unit, the main memory including a downstream queue that stores downstream messages from the processor complex to an I/O adapter and a downstream queue system address memory storing a pointer to a next, available location in the downstream queue at which the processor complex will store a next downstream message. A downstream queue device address memory stores a pointer to a next location in the downstream queue from which the I/O adapter will transfer a downstream message, and an upstream queue stores upstream messages from the I/O adapter to the processor complex with an upstream queue system address memory storing a pointer to next location in the upstream queue from which the processor complex will process a next upstream message. An upstream queue device address memory stores a next, available location in the upstream queue at which the I/O adapter will store a next upstream message. The system further comprises a bus interconnecting the processor complex and the I/O adapter for transmitting upstream and downstream messages. The I/O adapter may have another I/O adapter or an I/O device attached thereto. The I/O adapter has downstream message queue tracking registers tracking current, respective locations at which the processor complex and the I/O adapter are sending messages to and reading messages from the downstream queue, respectively; the I/O adapter has upstream message queue tracking registers tracking current, respective locations at which the I/O adapter and the processor complex are sending messages to and reading messages from the upstream queue, respectively. The I/O adapter also has a message processor processing upstream and downstream messages; and interrupt decision logic utilizing the upstream message queue tracking registers to decide when to interrupt the processor complex to initiate a context switch from the application handling state to the I/O handling state Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 5 illustrates the message transport mechanism registers according to the invention which may be provided in the I/O adapter shown in FIGS. 1 and 2.

DETAILED DESCRIPTION OF PREFERRED EMBODIMENT

Figure 1:
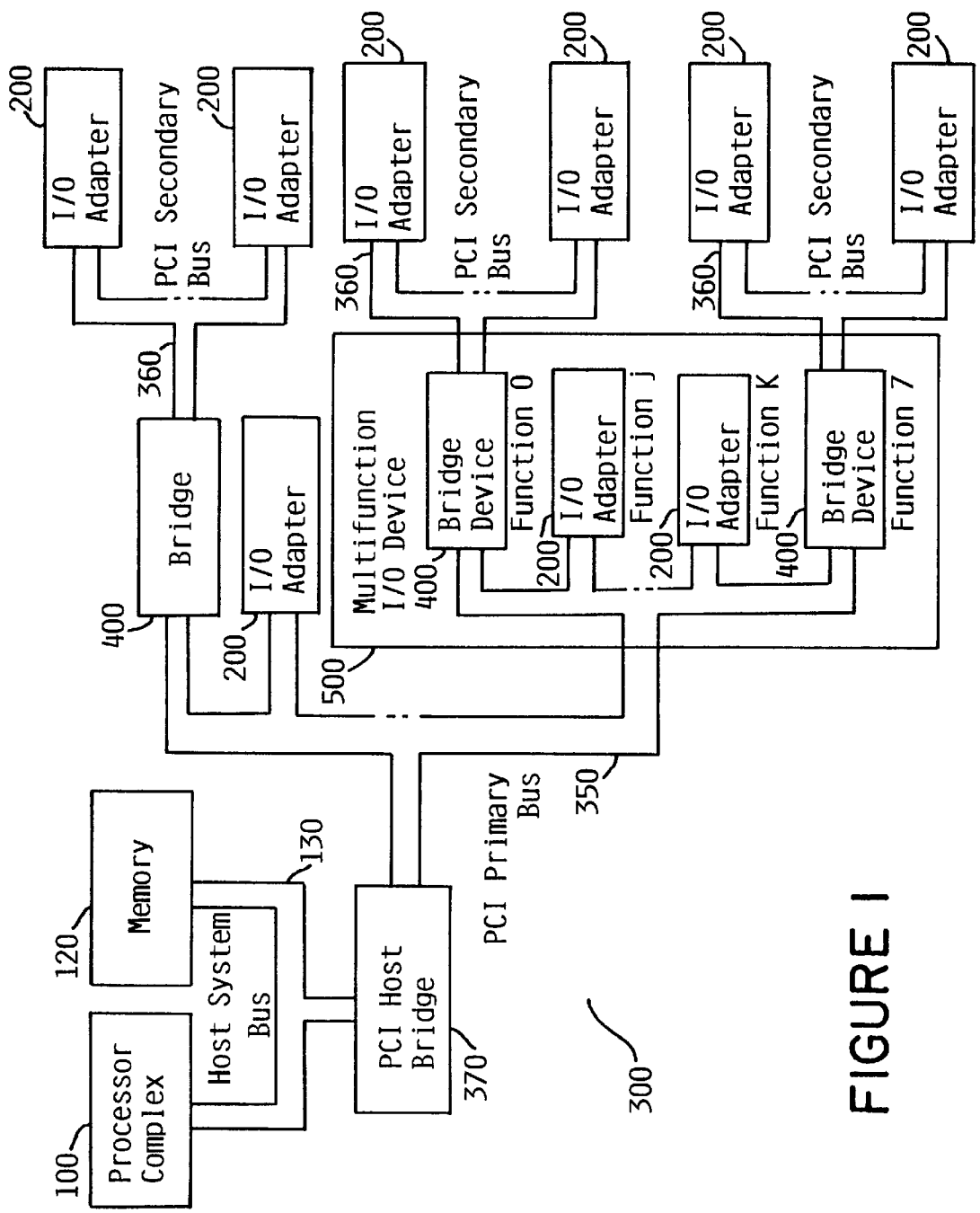
FIG. 1 is high-level block diagram of an I/O interconnection topology that may be utilized according to the teachings of the present invention.

FIG. 1 illustrates the components and an interconnection topology for a computer system utilizing the present invention. A processor complex 100 and memory 120 are connected to system memory bus 130. Host bridge 370 interconnects the system memory bus 130 with a primary bus 350. Various components are connected to the primary bus 350 including, for example, I/O adapter 200, bridge device 400 and a multifunction I/O processor or a PCI multifunction I/O adapter 500. The bridge device 400 bridges the primary bus 350 and a secondary bus 360 to which various I/O adapters 200 may be connected. The host bridge 370 and primary bus 350 are collectively referred to as an I/O bus 300. The I/O adapters 200 encompass a wide variety of I/O adapters including tape drives, optical drives, T-Ring, ethernet, FDDI, ATM, wireless relays, twinax, LAN connections, WAN connections, etc.

Figure 2:
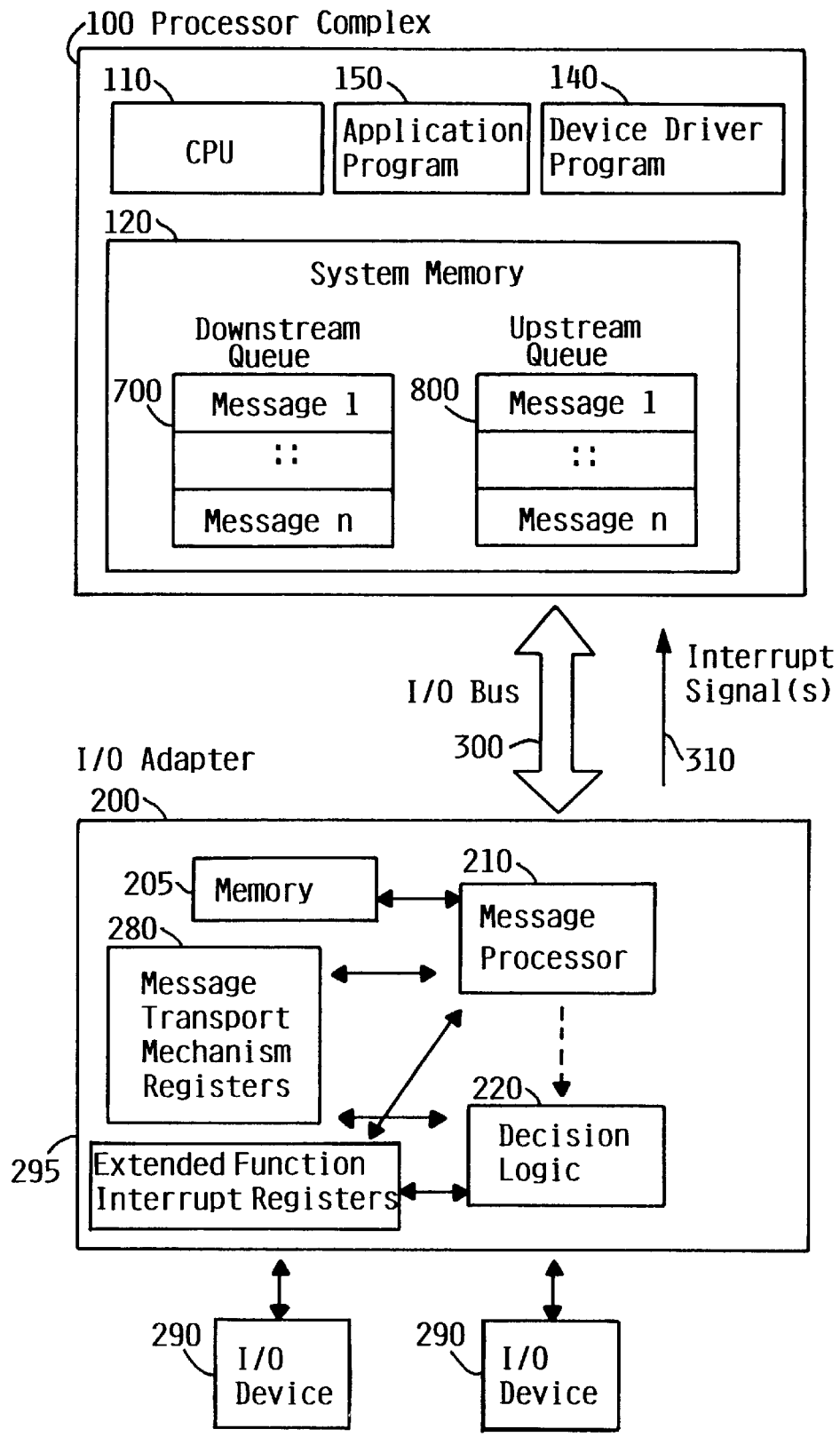
FIG. 2 is a simplified high-level block diagram simplifying the description of how the inventive I/O adapter interacts with the inventive processor complex.

FIG. 2 further illustrates the computer system of FIG. 1 having an I/O bus 300 interconnecting a processor complex 100 and an I/O adapter 200. One or more I/O devices 290 are connected to the I/O adapter 200. In the preferred implementation, the I/O bus 300 is a PCI Local Bus that conforms to the PCI Local Bus Specification and includes all of the PCI Local Bus specified signals between the processor complex 100 and I/O adapter 200. Although I/O bus 300 is shown as hardwired, physical data lines, the I/O bus 300 could be implemented with a wireless protocol. The interrupt signal 310 represents a subset of the I/O bus 300 and may be one or more of the conventional PCI Local Bus Interrupt (A, B, C, or D signals).

It is to be understood that the I/O adapter 200, processor complex 100, and I/O bus 300 may be reconfigured into the I/O interconnection topology shown or suggested in FIG. 1 or any variation thereof. It is also to be understood that I/O adapter 200 may be configured to be a multifunction I/O adapter 500 permitting multiple I/O adapters 200 and/or bridges 400 to be connected thereto.

The processor complex 100 includes a central processing unit (CPU) 110 and memory 120 connected thereto. Although only one CPU 110 is illustrated, it is to be understood that a multiple processors may be included within CPU 110. Furthermore, the memory 120 may be physically included within the processor complex 100 or connected to host system bus 130 as shown in FIG. 1. During I/O processing, the central processing unit 110 executes a device driver 140 program or function that permits the processor complex 100 to communicate with the I/O adapter 200. After handling an I/O interrupt signaled by interrupt signal 310, the CPU 110 typically performs a context switch with, for example, an application program 150, as is known in the art.

The memory 120 within processor complex 100 further includes a downstream queue structure 700 storing downstream messages such as command messages from the processor complex 100 to the I/O adapter 200. Memory 120 also stores an upstream queue structure 800 storing upstream messages such as response messages from the I/O adapter 200 to the processor complex 100. "Upstream queue" is generally synonymous with the term "response message queue." The terms "upstream" and "downstream" are relative terms taken from the processor complex 100 point of view. As an alternative, the point of view may be changed in an equivalent manner such that the roles of the processor complex 100 and I/O adapter 200 could be reversed such that the I/O adapter 200 is considered "upstream" with respect to the processor complex 100.

Figure 6A:
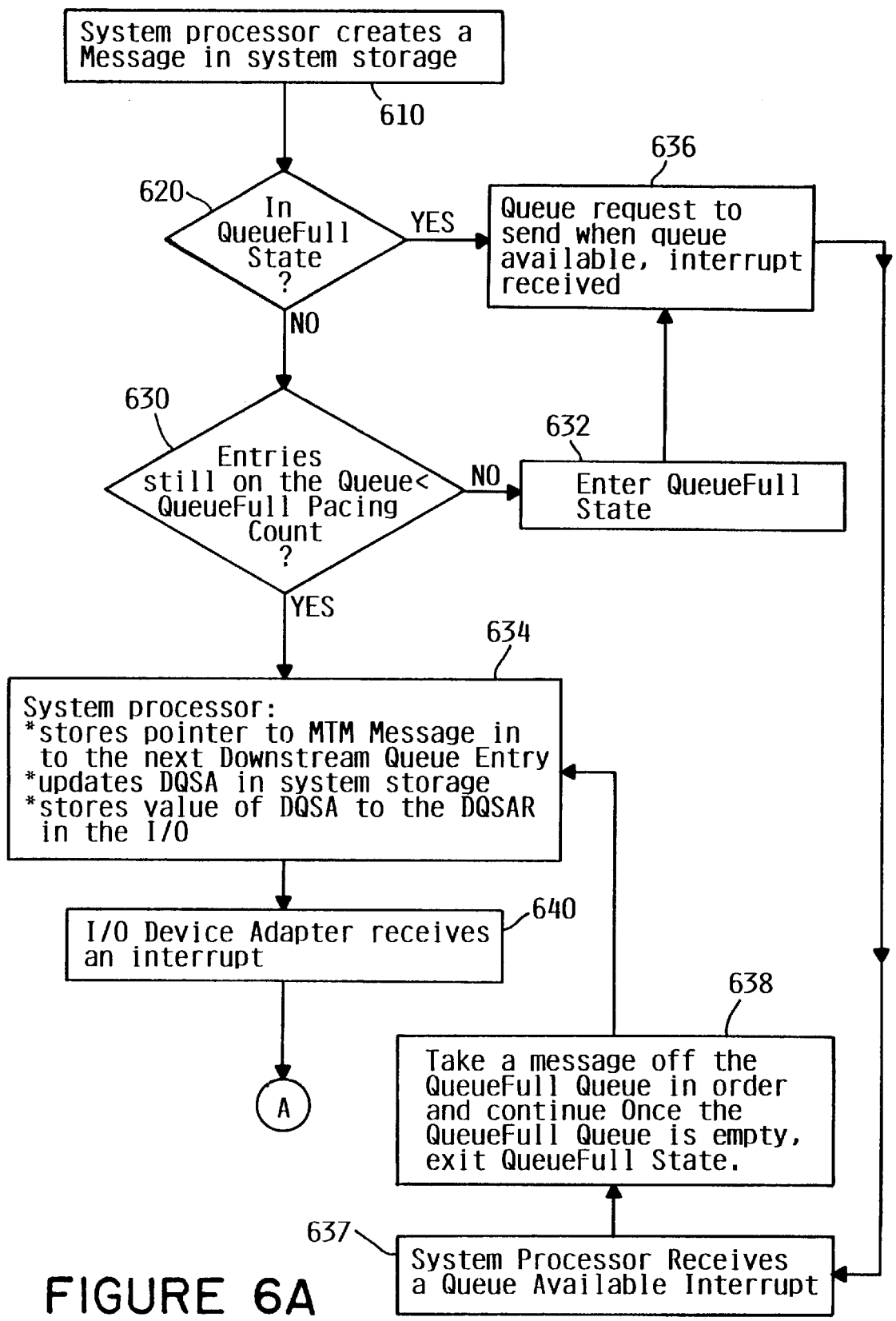
FIG. 6(a) represents a high-level flow chart illustrating an example of downstream message processing by the processor complex according to the invention that may be implemented by the inventive I/O system shown in FIG. 1.
Figures 1, 6B:
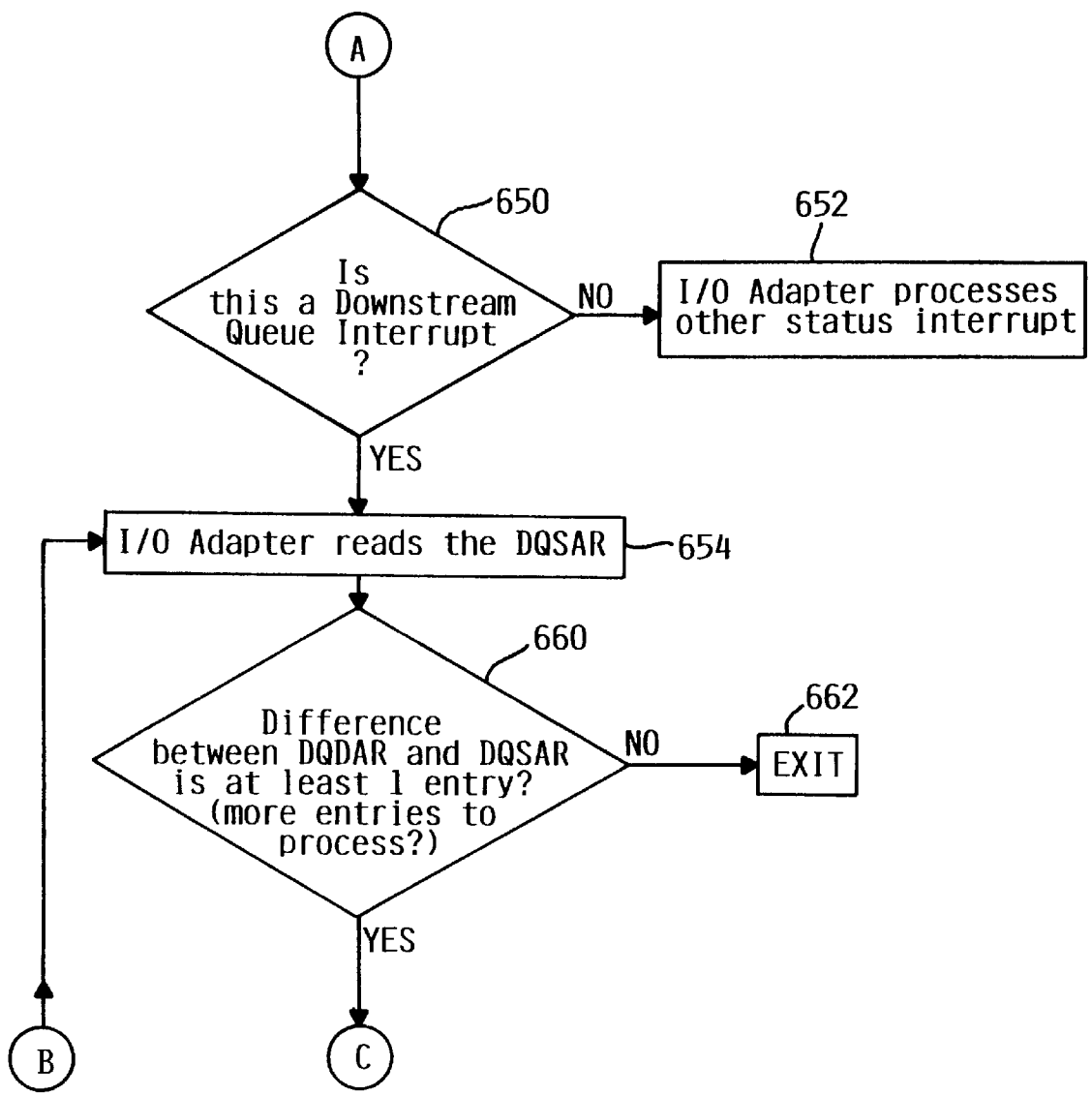
FIG. 6(b) represents a high-level flow chart illustrating an example of downstream message processing by the I/O adapter according to the invention that may be implemented by the inventive I/O system shown in FIG. 1.

Apart from and in addition to conventional I/O adapter and related control components such as direct memory access components, the I/O adapter 200 includes a message processor 210 in communication with decision logic 220. The I/O adapter 200 also includes message transport mechanism registers 280 and extended function interrupt registers 295 connected to the message processor 210 and decision logic 220 which may be used separately or in combination as discussed below in relation to FIGS. 5, 6a and 6b.

Preferably, the message transport mechanism registers 280 include other registers such as a response message pacing count register, a response message fast response time register, a response message slow response time register, a response timer, and a response message counter, each of which are connected to decision logic 220 and message processor 210 directly or indirectly. Further details of such additional message transport mechanisms registers can be found in the related IBM application, RO997-064, entitled "Interrupt Message Batching Apparatus and Method" that is incorporated by reference above.

The message processor 210 processes incoming downstream messages from the processor complex 100. For example, message processor 210 may process command messages from the downstream queue 700 to control and manage the I/O adapter 290 connected thereto to perform the commanded function. Message processor 210 also generates response messages and transmits the response messages to the upstream queue 800. As described in more detail below, the decision logic 220 decides when to interrupt the processor complex 100 that work is pending on the upstream queue 800 by sending an interrupt signal 310 to the processor complex 100.

The processor complex 100 may be considered a master that sends commands and a device, such as I/O adapter 200, is a server (slave) that executes those commands and provides responses to indicate the completion status of those commands and/or provide data requested by those commands. The downstream queue 700 shown in FIG. 2 is a collection of hardware and software elements by which I/O commands are communicated from the processor complex 100 to a device connected to the bus 300. Similarly, the upstream queue 800 is a collection of hardware and software elements by which response messages or asynchronous notifications are communicated from the I/O adapter 200 to the processor complex 100 that the commanded I/O operation is completed. The upstream and downstream queues 700, 800 are not entirely symmetric when utilized in a master processor complex 100 and a slave I/O adapter 200 arrangement illustrated in FIG. 2. It is noted, however, that defining a symmetric set of such queues to support, for example, peers on the I/O bus 300 rather than a master/slave relationship is within the scope of equivalents. A peer on the I/O bus 300 includes I/O adapters 200 connected to primary bus 350 as shown in FIG. 1 and I/O adapters 200 connected to the primary bus 350 or the secondary bus 360.

The invention utilizes a message transport mechanism which is a collection of apparatus and method elements for encapsulating messages, queuing messages, and amortizing interrupts. The processor complex 100 and I/O adapter 200 encapsulate I/O commands and responses and then transmit the encapsulated messages having a uniform structure over I/O bus 300.

The I/O command itself is a collection of data and protocols which instructs the I/O adapter 200 to control and manage the I/O adapter 290 to perform the commanded function. The I/O command is encapsulated by the processor complex 100 by placing the I/O command into a payload 610 of an encapsulated downstream message having the format illustrated in FIG. 3.

Figure 3:
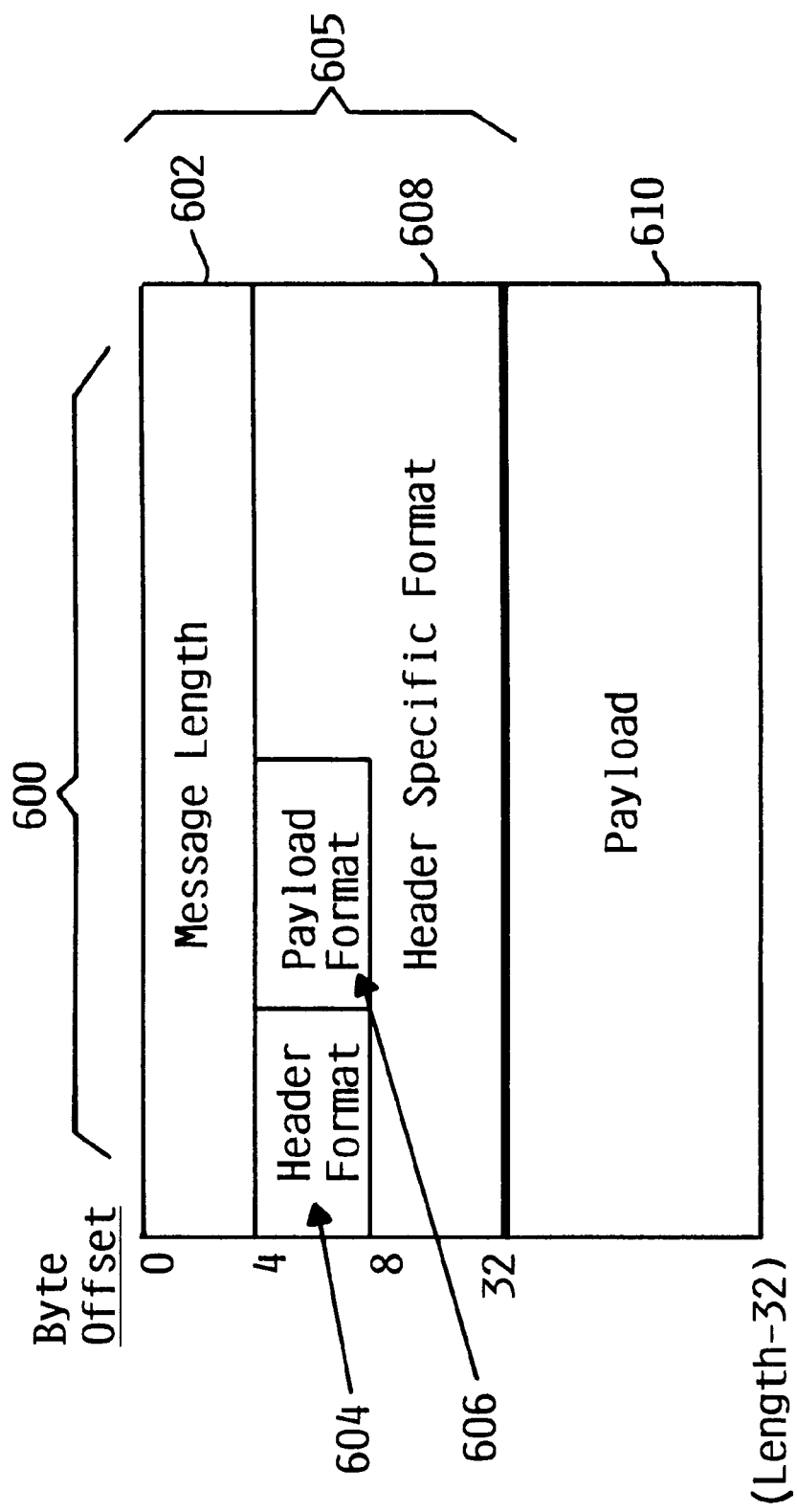
FIG. 3 is a diagram illustrating the format of a generalized encapsulated I/O message.

More specifically and as shown in FIG. 3, a generalized encapsulated message 600 is composed of a message header 605 and a message payload 610. The downstream and upstream message formats follow the general encapsulated message format, but contain slightly different data. Preferably, the message header 605 has a fixed format segment and a variable format segment. The fixed format segment of the header 605 includes the message length 602 which defines the total length of the message payload 610 plus the specific format 608, the header format 604 and the payload format 606. The header format 604 describes the variable format of the remainder of the header 605. Message length 602 designates the byte length of the complete message, including both the byte length of the header 605 and the message payload 610. The payload format 606 describes the data in the message payload 610 or it may state that there is no message payload 610. This gives the flexibility to pass a message payload 610 in which the message transport mechanism has no need to understand the data and is able to route based on the payload format 606. The content of the message payloads 610 that the I/O adapter 200 supports are indicated by the payload format code 606. For example, a downstream message may be defined as having a header format of 1 and an upstream message may be defined as having a header format of 2.

The idea behind the inventive message encapsulation is that while the content of the payload 610 is unique to the particular vendor and I/O adapter 200, the mechanisms that communicate the encapsulated message are independent of the particular I/O adapter or vendor. In other words, the invention utilizes a generalized encapsulated message structure 600 to deliver any type of message payload 610 simply by specifying the type and format of the message payload 610 in the payload format field 606. As an example only, a code in payload format field 606 could distinguish a small computer systems interface (SCSI) command from a token ring adapter command. The payload format field 606 is also used to distinguish platform specific architecture message payloads from other message payloads of a particular vendor. The invention accommodates other specific classes of message payloads by designating the class in the payload format field 606 and having the message payload 610 conform to that specific class of messages. The payload format field 606 identifies that this is a disk class message versus a graphics adapter or some other type of device class message.

For downstream encapsulated messages, the encapsulated message format 600 of FIG. 3 will have specific information, usually included in the space reserved for header specific format 608. The downstream encapsulated message may include an address in the downstream message queue 700 of the message which may be used as a validation check. The downstream encapsulated message may also include flags to indicate certain conditions. For a downstream encapsulated message, the message length 602 in the message header 605 should be identical in value to that of the downstream message queue 700 entry that addresses this message and is defined identically to the downstream message queue 700 entry message length.

Likewise, the encapsulated message format 600 of FIG. 3 contains specific information, also included in the space reserved for specific to header format 608, particular to upstream encapsulated messages. An error address portion of the header specific format 608 may be utilized to resolve addressing problems between the I/O adapter 200 and the processor complex 100. For example, if the I/O adapter 200 could not read the downstream message pointer n 732 in FIG. 4 in the downstream message queue 700, the I/O adapter 200 will insert the location in the downstream queue 700 that it was attempting to process into an error address field and set a flag in the header specific format 608 of the encapsulated upstream message. Another example of how an error address field in the header specific format 608 may be utilized is if a downstream message could not be retrieved from the memory 120, then the address that was accessed in the attempt to read the downstream message is loaded into the error address field and a different flag(s) of the upstream message may be set. The encapsulated upstream message may also include a message address field in the header specific format 608 which contains the address within the I/O adapter 200 of this upstream message. The message address may be used for diagnostic purposes. The message payload 610 of an upstream encapsulated message may communicate essentially any I/O protocol type. The payload format 606 assists the processor complex 100 in interpreting the response message by identifying the format and/or type of response message.

Figure 4A:
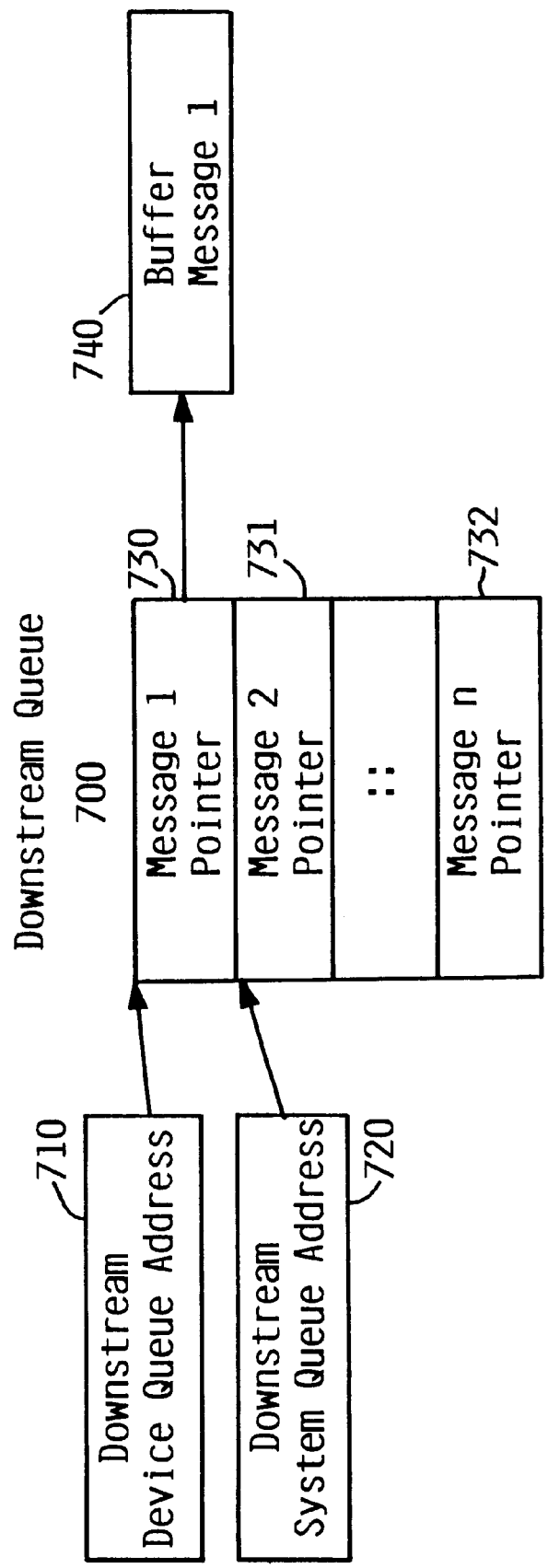
FIGS. 4a and 4b illustrate a downstream queue structure and an upstream queue structure, respectively, according to the invention.
Figure 4B:
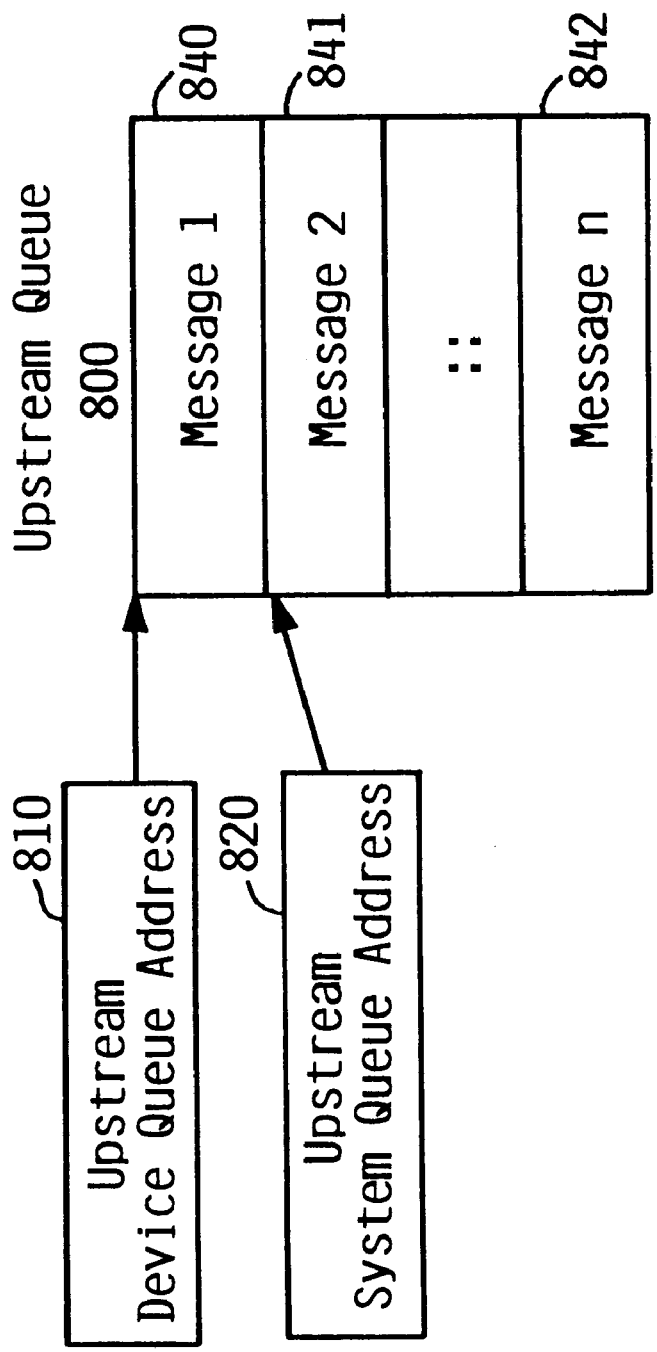

FIG. 4(*a*) is a representation of the downstream queue 700 as it exists in the processor complex memory 120 of FIG. 2. In the preferred embodiment, the processor complex 100 builds the downstream queue 700 as shown in FIG. 4(*a*) with a circular queue of downstream message pointers 730, 731, 732 and locations in processor complex main storage 120 that retain the current downstream queue positions at which both the processor complex 100 and the I/O adapter 200 are pointing. In other words, the preferred downstream queue 700 includes a pointer that points to a queue of downstream message pointers 730, 731, 732 each of which point to an actual downstream message 740. More specifically and as shown in FIG. 4, a pointer is stored in the downstream queue device address 710 and another pointer is stored in the downstream system queue address 720 each of which point to a circular queue of downstream message pointers 730, 731, 732. Downstream message 740 is pointed to by message 1 pointer 730 which, in turn, is pointed to by the pointer stored in the downstream queue device address 710. The downstream device queue address 710 keeps track of the next downstream queue 700 location from which the I/O adapter 200 will transfer a next downstream message.

With the implementation shown in FIG. 4(*a*) having two levels of indirect addressing, the downstream device queue address 710 stores a pointer to a next location in the queue of downstream message pointers 730, 731, 732 pointing to a next downstream queue location from which the I/O adapter 200 will transfer a next downstream message 740. The downstream system queue address 720 keeps track of the current location in the downstream queue 700 at which the processor complex 100 will store a next downstream message. With the implementation show in FIG. 4(*a*) having two levels of indirect addressing, the downstream system queue address 720 stores a pointer to a next, available location in a queue of downstream message pointers 730, 731, 732 at which the processor complex 100 may store a next downstream message pointer pointing to a next downstream queue location.

FIG. 4(*b*) is a representation of the upstream queue 800 as it exists in the processor complex memory 120 of FIG. 2. The upstream queue 800 is shown in FIG. 4(*b*) and also includes a circular queue of upstream messages 840, 841, 842. The upstream queue also utilizes indirect addressing in which a pointer points to the upstream queue 800. More specifically, two pointers are stored one in the upstream device queue address 810 and the other in the upstream system queue address 820, each of which points to a message in the upstream queue 800. The upstream queue 800 could also be located in the I/O adapter 200, but there is a latency associated with the processor complex 100 reading the response messages 840, 841, 842.

In contrast to the downstream queue 700, the upstream queue 800 has only one level of indirect addressing wherein the upstream device queue address 810 and the upstream system queue address 820 are pointers pointing directly to the upstream message in memory 120. The reason for the difference between the downstream and upstream queues 700, 800 is that putting messages into the upstream queue 800 requires an extra fetch from the processor complex memory 120 in order to find the location on which to store an upstream message. Furthermore, the upstream messages tend to be small whereas the downstream messages may be very large and the second level of indirect addressing allows larger messages to be stored without sacrificing efficiency of system memory management. There is also the fundamental performance cost or penalty on the upstream queue 800 in order for the I/O adapter 200 to determine the address of a message at which to store the upstream response message. Whereas in the downstream queue 700, that penalty has to be paid no matter what and so there is no additional penalty for having a second level of indirect addressing. It is to be understood, however, that the upstream queue 800 may be implemented with a structure similar to the downstream queue 700 and vice versa.

To establish a peer relationship between two I/O adapters 200 connected to the I/O bus 300, the invention may be modified by replicating the upstream and downstream queues 800, 700 in the opposite direction. For example, two I/O adapters 200 connected to the I/O bus 300 could each have a downstream queue 700 to each other and each could have an upstream queue 800 to each other so that a pair of such queues in opposite directions would be fully symmetric.

The I/O adapter message transport mechanism registers 280 are shown in FIG. 2 and are more specifically shown in FIG. 5. The I/O adapter 200 may implement any number of the message transport mechanism registers 280 depending upon the functionality desired for the I/O adapter 200. The basic set of message transport mechanism registers 280 for operating the downstream and upstream queues 700, 800 include a downstream queue device address register 271, a downstream queue system address register 272, an upstream queue device address register 281, and an upstream queue system address register 282. In general, the downstream queue device address register 271 and downstream queue system address register 272 in the I/O adapter message transport mechanism register space 280 contain copies of the downstream device queue address 710 and downstream system queue address 720, respectively from processor complex memory 120. Similarly, the upstream queue device address register 281 and upstream queue system address register 282 in the I/O adapter message transport mechanism register space 280 contain copies of the upstream device queue address 810 and upstream system queue address 820, respectively from processor complex memory 120. The downstream queue device address register 271 and downstream queue system address register 272 may be collectively referred to as downstream message queue tracking registers tracking current, respective locations at which the processor complex 100 and I/O adapter 200 are sending messages to and reading messages from the downstream queue 700. The upstream queue device address register 281 and upstream queue system address register 282 may be collectively referred to as upstream message queue tracking registers tracking current, respective locations at which the I/O adapter 200 and processor complex 100 are sending messages to and reading messages from the upstream queue 800.

Enhancing the basic set of message transport mechanism registers 280 so as to provide improved queue handling functionalities includes adding a downstream queue parameter register 275, a upstream queue parameter register 285, a downstream queue base address register 277, a downstream queue limit address register 278, an upstream queue parameter register 285, an upstream queue base address register 287, and an upstream queue limit address register 288 to the message transport mechanism register space 280. As the names imply, the downstream and upstream base address registers 277, 287 store the base or starting address of the downstream and upstream queues 700, 800. Furthermore, the downstream and upstream limit address registers 278, 288 store the limit or last address of the downstream and upstream queues 700, 800. Together, the base and limit addresses define the extent and location of the downstream and upstream queues 700, 800.

The downstream queue parameter register 275 defines various downstream queue operating parameters for the I/O adapter 200. For example, in most asynchronous message passing schemes the problem of available space in the receiving entity is always a concern. How do the two devices exchange the number of messages called a pacing count that each will accept? How does one device communicate that it does not have space for a message it received because its queue is fall? How does the same device communicate that it can now accept more messages because its queue has space available? Parameters that determine these variables may be defined in the downstream queue parameter register 275.

Further enhancing the basic set of message transport mechanism registers 280 in order to reduce the number and frequency of loading operations from device PCI memory space and interrupt signals from the device functionalities includes adding a downstream device address shadow address register 276, an upstream device address shadow address register 286 to the message transport mechanism register space 280. The purpose and function of these message transport mechanism registers set enhancements is more fully described in relation to FIGS. 6(a)–(b) and 7(a)–(b).

The method of transporting messages into and out of a processor complex 100 from an I/O adapter 200 begins with queue initialization. The processor complex 100 initializes the downstream queue device address register 271 such that it contains an address that points to the same downstream queue address at which the downstream device queue address value 710 points. Similarly, the downstream queue system address register 272 is initialized to point to the same downstream queue address at which the downstream system queue address 720 points. A similar initialization is performed for the upstream queue device address register 281 and upstream queue system address register 282.

Downstream Queue Operation

The difference between the addresses stored by the downstream queue system address register 272 and the downstream queue device address register 271 indicates to the I/O adapter 200 that there is work pending on the downstream queue 700. If work is pending on the downstream queue, the I/O adapter 200 then performs a direct memory access from system memory 120 to the I/O adapter memory 205 to transfer the downstream message pointer 730. Then the I/O adapter 200 interprets the address received from that downstream message pointer 730 to then reference the actual message 740 from the downstream queue 700 and direct memory access that message 740 from the system memory 120 to the I/O adapter memory 205.

Preferably, the I/O adapter 200 transfers the downstream message pointer 730 and a value indicating the length of the downstream message 740. Thus, when I/O adapter 200 actually reads the downstream message 740 from system memory 120, it knows the size of the downstream message 740. Knowing the size of the downstream message 740 prevents multiple fetches if the message is long and prevents interrogation of the downstream message to see if another fetch is necessary to complete the transfer. This, in turn, minimized processor complex 100 latency.

After transferring the downstream message, the I/O adapter 200 updates the pointer in the downstream queue device address register 271 to indicate that it has now moved past the message 740 location. Then, the I/O adapter 200 updates the system main store address downstream device queue address 710, thereby indicating to the processor complex 100 where the I/O adapter 200 is currently pointing.

The above process continues as long as the downstream queue 700 has messages to send to the I/O adapter 200. The processor complex 100 adds messages to unused or available locations within the downstream queue 700 and updates the pointer in the downstream system queue address 720 to point to the next location at which it will store a message. Provided that the downstream queue system address 720 does not catch up with the downstream queue device address 710 in a circular fashion, the downstream queue 700 can continue to hold new messages.

At the point which the downstream queue system address 720 is one less than the downstream queue device address 710, the processor complex 100 will stop adding to the downstream queue 700 and wait for the I/O adapter 200 to transfer one or more of those messages before resuming adding messages to the newly created empty locations. One empty space between the device and the system address is required when the system is chasing the device address in a circular fashion.

Given messages in the downstream queue 700, it is generally a task of the I/O adapter 200 to decide when to process messages in the downstream queue 700. The I/O adapter 200 makes a decision based on available resources within it as to when it can transfer a message and begin processing that message. For example, if a I/O adapter 200 has hardware interrupts disabled, it may receive multiple messages from the downstream queue 700 and the processor complex 100, but the I/O adapter 200 would only take one interrupt. Then, the I/O adapter 200 would process multiple messages underneath or in response to the one interrupt that was actually received.

In general, the processor complex 100 may remove entries from the downstream queue 700 only after the I/O adapter 200 has successfully transferred the downstream message for that entry, or after the I/O adapter 200 has been reset or signalled a downstream queue disable interrupt.

Whenever the distance from the downstream system queue address to the downstream device queue address is less than or equal to the value stored in the I/O adapter adapter's downstream queue parameter register 275, the processor complex 100 ceases adding messages to the downstream queue 700 and waits for the I/O adapter 200 to signal a downstream queue available interrupt.

The I/O adapter 200 signals a downstream queue available condition in the device interrupt status register 296 when it has recognized a queue available condition by transferring sufficient messages from the downstream queue 700 to meet the requirements of the queue available pacing count stored in the downstream queue parameter register 275.

Figures 2, 6B:
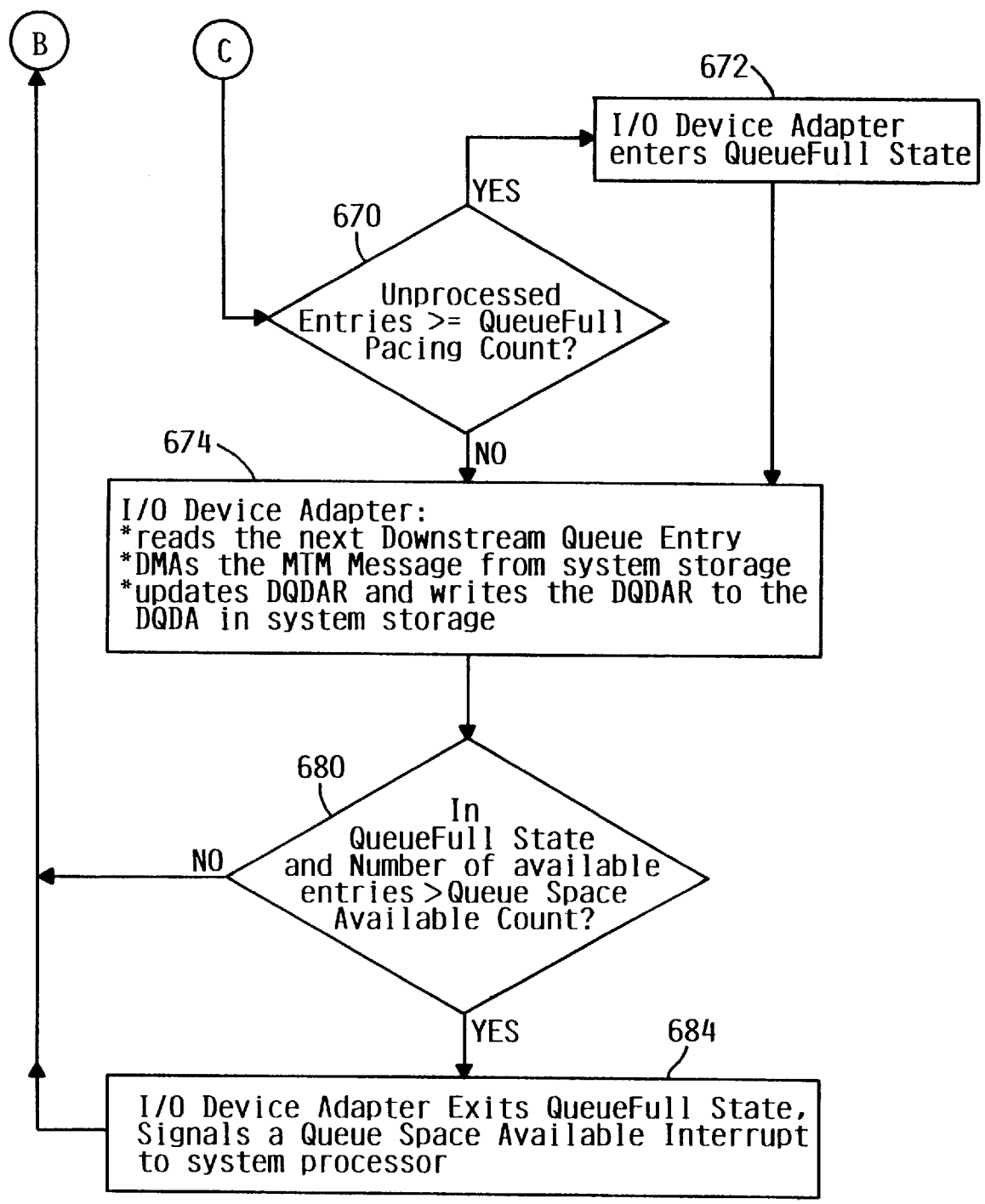
Figure 7A:
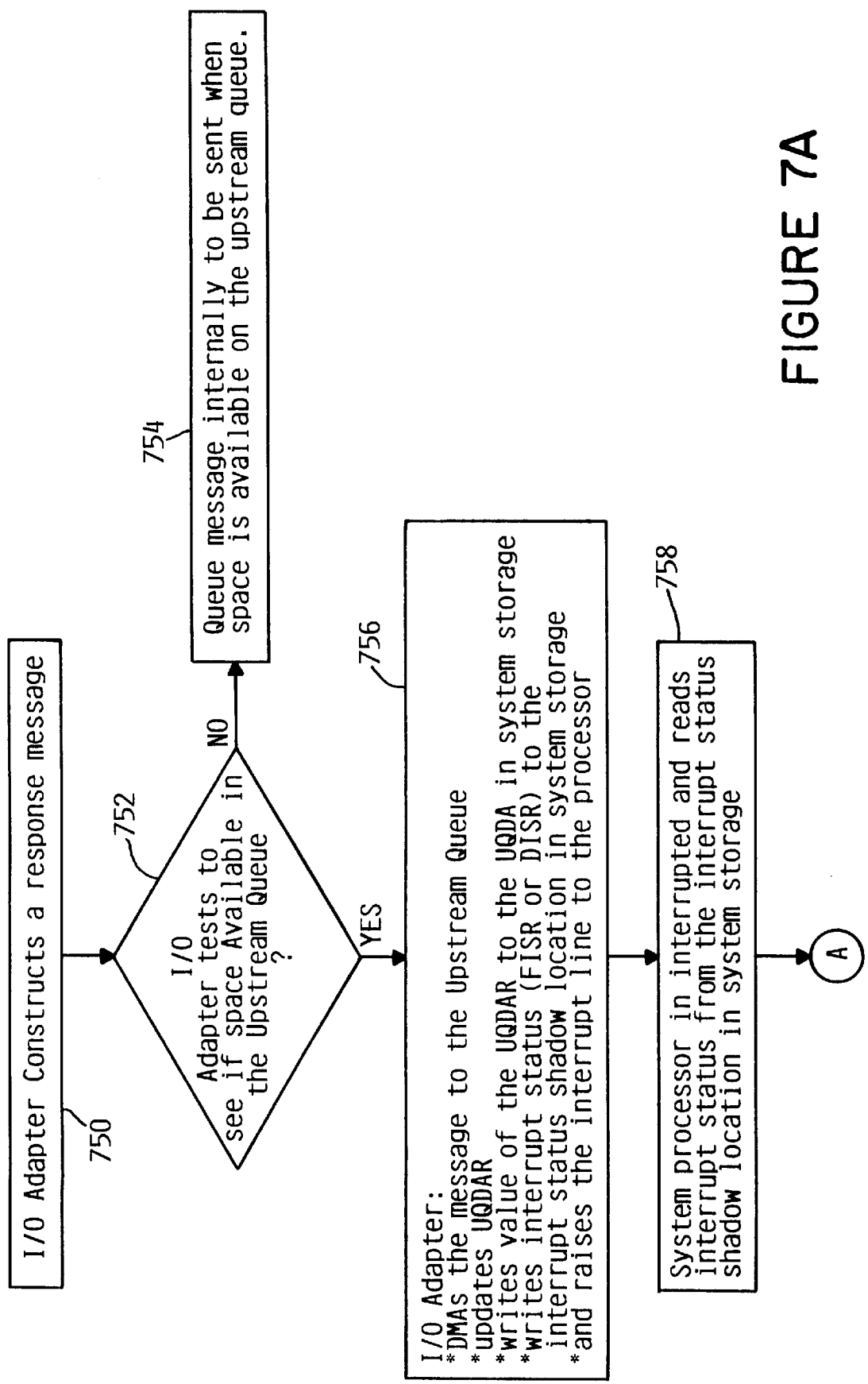
FIGS. 7(a) and 7(b) represent a high-level flow chart illustrating an example of upstream message flow according to the invention that may be implemented by the inventive I/O system shown in FIG. 1.
Figure 7B:
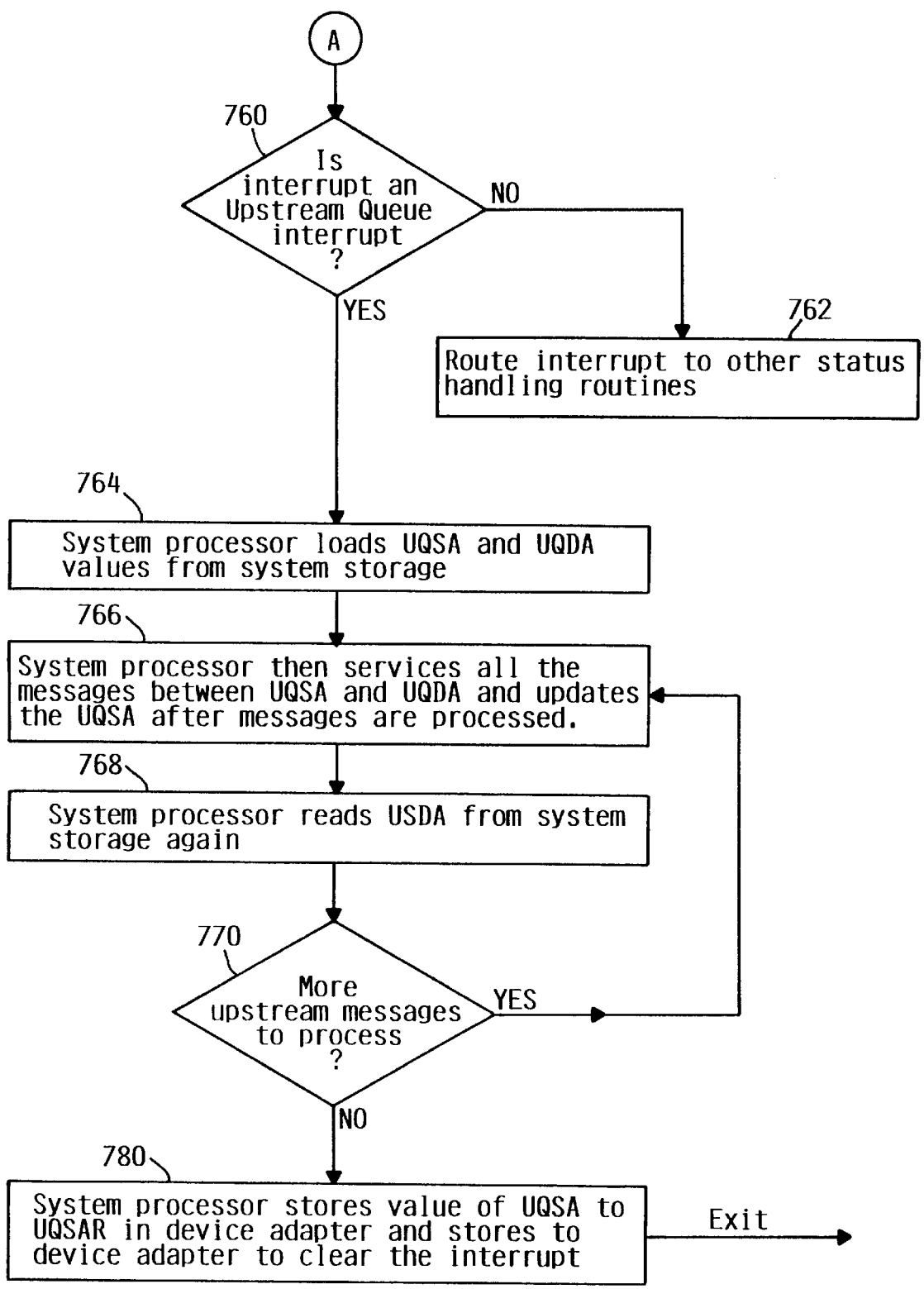

The above general description of downstream queue operation may be specifically implemented as shown in the high-level flowcharts of FIGS. 6(*a*) and 6(*b*). As shown in FIG. 6(*a*), the message transport mechanism downstream message processing begins with step 610 when the processor complex 100 creates an encapsulated message transport mechanism downstream message 600 as described above in relation to FIG. 3.

Before adding a downstream message to the downstream queue 700, the processor complex 100 first verifies that there is room on the downstream queue 700 in step 620. Step 620 may simply test a flag or other indicator that keeps track of a queue full state or step 620 may determine a queue full state from the maximum number messages capable of being stored in the downstream queue 700. Preferably, step 620 checks a flag that is set when queue state is entered and reset when exited. A flag is used instead of checking the distance between the downstream system queue address 720 and the downstream device queue address 710 to ensure that messages are queued to the I/O adapter 200 in the received order. The flag ensures that new messages are placed on the queue fall queue behind older messages and then transferred to downstream queue during queue space available processing.

If the downstream queue 700 is full, then the flow proceeds to step 636 in which the processor complex 100 will internally store the downstream message to be enqueued in the downstream queue 700 when space is available and await a queue available interrupt. When the queue space available interrupt is received by the processor complex 100, as indicated in step 637, then step 638 is executed by the processor complex 100 which takes messages off a queue full queue and places them on the downstream message queue until all the messages are off the queue full queue and queue full state is exited or until the downstream message queue is fall again. For example, there may be room on the downstream message queue for ten messages to be sent and fifteen messages may be pending on the queue fall queue. In this case, programming should remove ten messages from the queue fall queue and place them on the downstream queue and stay in queue fall state. After exiting queue full state, step 634 is performed as described below.

If step 620 determines that the downstream queue 700 is not full, then step 630 determines whether the number of entries on the queue 700 is less than the queue full pacing count. If step 630 determines that the number of entries on the queue is greater than the queue full pacing count, then step 632 indicates that the queue is considered full and step 636 causes the processor complex 100 to internally store the downstream message to be enqueued when the queue available interrupt is received. If the number of entries on the queue is less than the queue full pacing count then the processor complex 100, in step 634, stores the address of the next downstream message in the queue entry pointed to by the downstream system queue address 720, increments the downstream system queue address 720, and stores the new downstream system queue address value to the I/O adapter's downstream system queue address register 272.

The processor complex 100, in step 640, notifies the I/O adapter 200 that the downstream system queue address 271 has been updated via an interrupt signal 310. Alternatively, the act of storing the value of the new downstream system queue address to the downstream system queue address 272 in step 634 serves as a notification that work is pending on the downstream queue instead of sending a separate interrupt signal in step 640.

Then, step 650 interrogates the interrupt to determine if the interrupt is for a downstream or other event. For downstream events, the I/O adapter 200 will internally cache a copy of the downstream system queue address and downstream device queue address. For non-downstream event interrupts, processing is passed to additional logic (not shown) to handle that event in step 652.

At any point after the value of the downstream system queue address 720 is stored into the downstream system queue address register 272 as in step 654, the I/O adapter 200 may fetch as many messages from the downstream queue 700 as are indicated by the distance from the downstream system queue address 720 to the cached value of the downstream system queue address. More particularly in step 674 the I/O adapter 200 reads the next downstream queue entry indicated by the downstream device queue address 271, utilizes a direct memory access transfer to transfer the downstream message from the downstream queue 700, and updates the downstream device queue address register 271 and stores the updated value in the downstream device queue address 710 via I/O bus 300. Step 660 checks whether there are messages left on the downstream queue by testing whether the cached downstream device queue address value is equal to the cached downstream system queue address value. If step 660 determines that there are downstream messages left to process, then the process continues with step 670, else the process exits at 662.

Step 670 decides whether the number of unprocessed queue entries is greater than or equal to the queue full pacing count. If yes, then the queue is full and step 672 indicates that the I/O adapter 200 is now in the queue full state. If no, then step 674 is performed. Step 674 also follows step 672. Step 674 causes the I/O adapter 200 to read the next downstream queue entry by using a direct memory accessing the system memory 120, update the downstream queue device address register 271 and write the downstream queue address register contents to the downstream queue device address 710. Then, step 680 is performed.

Because the processor complex 100 may add new downstream messages to the downstream queue 700 while the I/O adapter 200 is transferring other downstream messages from the downstream queue 700, the process, in step 680, checks if the queue 700 is in the queue full state and whether the number of available entries is greater than the queue space available count. To determine the number of available entries, the I/O adapter 200 reads the (uncached) downstream device queue address 710 and downstream system queue address 720 values and checks whether the newly read downstream device queue address is greater than the downstream system queue address. If the answer to the test posed in step 680 is yes, then the I/O adapter 200 exits the queue full state, signals a queue space available interrupt to the processor complex 100, and executes step 654. If the answer to the test posed in step 680 is no, then the process loops back to step 654.

Upstream Queue Operation

The processing flow for managing the upstream queue 800 is shown in FIGS. 7(*a*) and 7(*b*). The upstream queue operation functions logically much like the downstream queue 700 in the sense that it is a circular queue of entries with a similar system queue address and device queue address in the processor complex memory 120 and upstream queue system address register 282 and upstream queue device address registers 281 in the I/O adapter 200. The I/O adapter 200 and the processor complex 100 both communicate their current positions in the upstream queue 800 as they move through the upstream queue 800.

When an I/O adapter 200 is prepared to send a response message to the processor complex via the I/O adapter 200, the I/O adapter 200 writes the response message into memory 120 at the current upstream queue position it has in its upstream queue device address register 281. The I/O adapter 200 then updates the upstream device queue address 810 for the upstream queue 800. This indicates to the processor complex 100 where the I/O adapter 200 is now pointing, but does not in and of itself notify the processor complex 100 that there is a message pending on the upstream queue 800. Rather, to indicate to the system that such an event has occurred, the I/O adapter 200 presents an interrupt to the processor complex 100. In the simplest form, the I/O adapter 200 may interrupt the processor complex 100 every time it has stored a message on the upstream queue 800. The upstream queue system address register 282 or upstream queue system address location 820 pointing to the upstream queue 800 indicates the next place the processor complex 100 should receive a message. Thus, once having had an interrupt signal or other sort of interrupt event to notify the processor complex 100 that it should process a message on the upstream queue 800, the processor complex 100 uses its current upstream system address queue pointer 820 to find and then process the message. Then, the pointer in upstream queue system address 820 is updated and compared to the current upstream queue device address 810 in the system main store 120 to determine if there are more messages to process on the upstream queue 800. If this comparison indicates there is another message, then the processor complex 100 processes this message.

Following each processing of an upstream message, the processor complex 100 advances its upstream queue system address 820 and then performs a write to the upstream queue system address register 282 to indicate to the I/O adapter 200 that the processor complex 100 has moved forward in the queue. This allows the I/O adapter 200 to compare its upstream queue device address register 281 and upstream system device address register 282 and thereby determine that there is space to put new messages into the upstream queue 800.

In general, the upstream queue 800 stores response messages indicating the I/O adapter 200 has completed processing the command in the downstream message. The upstream queue, however, may also contain command messages that are initiated by the I/O adapter 200. System programming in the processor complex 100 initializes the upstream queue system address 820 and the upstream queue device address 810 in system main storage 120 and the upstream queue system address 282 and upstream queue device address register 281 in the message transport mechanism register space 280 to point to the memory 120 location of the first entry in the upstream queue 800. These may be equal only when the upstream queue 800 is completely empty.

Any time that there are entries on the upstream message queue that the processor complex 100 has not retrieved, the upstream queue device address 810 leads the upstream queue system address 820, and the upstream queue device address register 281 leads the upstream queue system address register 282 by a distance representing that number of message entries pending for the processor complex 100. Each time the processor complex 100 retrieves one or more upstream messages, it updates the upstream queue system address 820 and stores the updated upstream queue system address to the upstream queue system address register 281 in the I/O adapter 200.

As more particularly shown in the implementation of FIGS. 7(*a*) and 7(*b*), the inventive upstream message processing sequence begins where the I/O adapter 200 constructs an upstream response message in step 750. Prior to adding the message to the upstream queue 800, the I/O adapter 200 checks whether there is space on the upstream queue 800 by testing whether the upstream queue device address register 281 is more than one entry behind the last upstream queue system address register 282 in step 752. To help prevent queue overflow, the invention always maintains at least one empty queue entry between the upstream queue system address and the upstream queue device address. If no space is available, then step 754 is executed wherein the message is queued internally in the I/O adapter 200 to be sent to the upstream queue 800 when space is available.

If space is available on the upstream queue 800, the I/O adapter 200 stores the encapsulated message in the queue in steps 756 after which the I/O adapter 200 updates the upstream queue device address register 281 and stores this updated value to the upstream queue device address 810 in system storage 120.

If a plurality of devices such as I/O adapters 200, multi-function I/O adapters 500 and/or bridge devices 400 are connected to the I/O bus 300, then each of these adapters and devices individually shadows its interrupt status vector to a separate interrupt status shadow address. Each device or adapter accesses its own interrupt status shadow address register to determine the location in memory 120 which contains the interrupt status shadow register associated with that device.

After shadowing interrupt status, the I/O adapter 200 signals to the processor complex 100 that one or more messages are pending in the upstream queue by sending an interrupt signal 310. The processor complex 100 receives the interrupt signal 310 and, in step 758, reads the interrupt status shadow from the interrupt status shadow address in memory 120.

The shadowed interrupt status is interrogated to determine the type of interrupt received in step 760. Depending on the conditions established by the upstream queue parameter register indicating if the I/O adapter is a single 200 or multi-function 500 adapter, the I/O adapter 200, 500 sets an upstream queue stored condition in either a device interrupt status register or a function interrupt status register and shadows these registers to the interrupt status shadow address in main memory 120. The interrupt status shadow address register specifies the location in memory 120 which contains the interrupt status shadow register. For non-upstream queue interrupts, step 762 routes the interrupt to the appropriate logic to handle the condition. For upstream interrupts, however, step 764 directs the processor 100 to inspect the upstream queue system address 820 and upstream queue device address 810 in system storage 120 to determine the number of pending upstream queue entries. Then, in step 766, the processor 100 processes all the upstream queue entries between the upstream queue system address 820 and upstream queue device address 810.

The upstream queue device address 810 is then read again in step 768 to determine if any additional entries have arrived in the upstream queue 800 while other entries were being processed. If more entries have arrived as determined by step 770, system programming again processes all the new entries by looping back to step 766. If no new entries have been received, then step 780 will store the upstream queue system address 820 to the upstream queue system address register 282 in the I/O adapter 200 and clears the interrupt condition by storing to the I/O adapter 200.

Message Transport Mechanism Single Threaded Mode

The message transport mechanism single threaded mode is a simplification of the message transport mechanism queue structure. Because the message transport mechanism queuing mechanisms may not be supported by every I/O adapter 200 connected to the system, the invention also provides a single threaded mode to provide mechanisms and functions supporting other I/O adapters and adapters.

The single threaded mode is intended to be the simplified mode which, instead of having upstream and downstream queues, simply includes a single command location and a single response location in system memory 120. In other words, the upstream and downstream "queues" only have a single memory location in the single threaded mode. With only a single location in memory 120 to store a command and a single location in memory to store responses, an interlock mechanism must be utilized to prevent overwrites.

Basically, the I/O adapter 200 has a single device address register and does not have the system address registers. More particularly, the single threaded mode includes only one downstream device queue address register 271 and one upstream queue device address register 281 because only a single queue entry is all that the I/O adapter 200 needs to implement an interrupt mechanism. To synchronize when the processor complex 100 stores a message to a downstream message buffer, the processor complex 100 stores the message buffer address to the downstream device queue address register 710. The I/O adapter 200 then transfers a downstream message from the one address indicated in the downstream device queue address 710. When that transfer is complete, the processor complex 100 has the option of turning on a bit in the downstream message header 605 that indicates that the system requests an interrupt when the fetch has been completed. In the single-threaded mode, the processor complex 100 may interlock with the interrupt or it may interlock with having received the upstream response, depending on whether the device has any internal queuing capabilities.

When the I/O adapter 200 receives a message and internally queues that message and the downstream message buffer is free, the processor complex 100 uses the fetch complete mechanism to inquire if this fetch is complete so the processor complex 100 can store a new message to the I/O adapter 200. If the I/O adapter 200 has no internal queuing mechanism, then the processor complex 100 waits until a response message has been signalled and processed before it reinstructs the device with a new downstream message.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A message transport system transporting messages between a host system and an I/O adapter having an I/O adapter connected thereto, comprising:

a downstream queue provided in a memory of the host system, said downstream queue storing a queue of message pointers pointing to command messages generated by the host system and stored in the host system memory;

a downstream queue system address pointer located in the host system memory pointing to a next downstream queue address at which the host system will store a next message pointer;

a downstream queue system address register located in the I/O adapter pointing to the next downstream queue address at which the host system will store the next message pointer;

a downstream queue device address pointer located in the host system memory pointing to a next downstream queue address from which the I/O adapter will read a next message pointer;

a downstream queue device address register located in the I/O adapter pointing to a next downstream queue address from which the I/O adapter will read the next message pointer;

a bus interconnecting the host system and the I/O adapter;

an upstream queue provided in the memory of the host system, said upstream queue storing a queue of response messages generated by the I/O adapter when the command message has been processed by the I/O adapter;

an upstream queue system address pointer located in the host system memory pointing to a next response message to be processed by the host system;

an upstream queue system address register located in the I/O adapter storing an address of a next response message to be processed by the host system;

an upstream queue device address pointer located in the host system memory pointing to a next response message address at which the I/O adapter will store a next response message; and an upstream queue device address register located in the I/O adapter storing an address of the next response message address at which the I/O adapter will store a next response message.

2. The message transport system according to claim 1, wherein the host system updates said downstream queue system address pointer after storing a next command message and next message pointer in the host system memory and then stores the updated downstream queue system address pointer in said downstream queue system address register via the bus;

wherein the I/O adapter accesses said downstream queue device address pointer to determine where to retrieve the next command message, retrieves the next command message from the determined host system memory address, and updates said downstream queue device address pointer and register.

3. The message transport system according to claim 1, wherein the host system updates said upstream queue system address pointer after retrieving the next response message from the host system memory and then stores the updated upstream queue system address pointer in said upstream system address register via the bus; and wherein the I/O adapter accesses said upstream queue device address pointer to determine where to store the next response message, stores the next response message at the determined host system memory address, and updates said upstream queue device address pointer and register.

4. The message transport system according to claim 1, wherein the host system sends an interrupt signal to the I/O adapter when there is a difference between the downstream queue system address and the downstream device address.

5. The message transport system according to claim 1, the host system further including a downstream queue full pacing count register storing a downstream queue full pacing count value, wherein the host system sends an interrupt signal when the difference between the downstream queue system address and the downstream device address exceeds the queue full pacing count value stored by said queue full pacing count register, wherein the I/O adapter transfers command messages from said downstream queue in response to the interrupt signal.

6. The message transport system according to claim 5, wherein the I/O adapter transfers command messages from said downstream queue until the difference between the downstream queue system address and the downstream queue device address is less than a queue available pacing count.

7. The message transport system according to claim 1, wherein the command message is a payload of an encapsulated command message having a payload format code identifying a format of the command message payload the I/O adapter including a message processor extracting the encapsulated command message payload and commanding the I/O adapter to perform the commanded function.

8. The message transport system according to claim 1, wherein the response message is a payload of an encapsulated response message having a payload format code identifying a format of the response message payload, the host system extracting the encapsulated response message payload and processing the response message.

9. The message transport system according to claim 1, wherein the response message is an encapsulated response message including an error address field identifying a location in the host system memory that caused an error.

10. An input/output (I/O) system, comprising:

a processor complex including
  a processing unit capable of switching context between an I/O adapter handling state and an application program handling state;
  main memory connected to the processing unit, said main memory including
    a downstream queue storing downstream messages from said processor complex to an I/O adapter,
    downstream queue system address memory storing a pointer to a next, available location in the downstream queue at which said processor complex will store a next downstream message,
    downstream queue device address memory storing a pointer to a next location in the downstream queue from which the I/O adapter will transfer a downstream message,
    an upstream queue storing upstream messages from said I/O adapter to said processor complex,
    upstream queue system address memory storing a pointer to next location in the upstream queue from which the processor complex will process a next upstream message, and
    upstream queue device address memory storing a next, available location in the upstream queue at which the I/O adapter will store a next upstream message, a bus interconnecting said processor complex and said I/O adapter and transmitting upstream and downstream messages;

said I/O adapter having an I/O adapter attached thereto, said I/O adapter including
  downstream message queue tracking registers tracking current, respective locations at which said processor complex and said I/O adapter are sending messages to and reading messages from the downstream queue, respectively;
  upstream message queue tracking registers tracking current, respective locations at which said I/O adapter and said processor complex are sending messages to and reading messages from the upstream queue, respectively;
  a message processor processing upstream and downstream messages; and interrupt decision logic utilizing the upstream message queue tracking registers to decide when to interrupt the processor complex to initiate a context switch from the application handling state to the I/O handling state.

11. The I/O system of claim 10, said processor complex utilizing the downstream queue system and device address memories to decide when to send an interrupt signal to said I/O adapter to initiate transfer of a downstream message from the downstream queue in said main memory to said I/O adapter.

12. The I/O system of claim 11, said downstream queue transfer logic transferring all downstream messages on the downstream queue when the decision is made to transfer a downstream message.

13. The I/O system of claim 10, said downstream queue system address memory storing a pointer to a next, available location in a queue of downstream pointers at which the processor complex may store a next downstream message pointer pointing to a next downstream queue location; and said downstream queue device address memory storing a pointer to a next location in the queue of downstream pointers pointing to a next downstream queue location from which the I/O adapter will transfer a downstream message, said downstream message queue tracking registers including a downstream queue system address register storing a pointer to a next, available location in a queue of downstream pointers at which the processor complex may store a next downstream message pointer pointing to a next downstream queue location; and a downstream queue device address register storing a pointer to a next location in the queue of downstream pointers pointing to a next downstream queue location from which the I/O adapter will transfer a downstream message.

14. The I/O system of claim 13, said processor complex adding a pointer to the queue of downstream pointers, updating the pointer in the downstream queue system address to point to the added pointer, and storing the value of the updated downstream queue system address in the downstream queue system address register when a downstream message is added to the downstream queue.

15. The I/O system of claim 10, said processor complex sending an interrupt signal to said I/O adapter when a difference between the values stored in the downstream queue system address memory and the downstream queue device address memory exceeds a queue full pacing count.

16. The I/O system of claim 15, said downstream queue transfer logic transferring all downstream messages on the downstream queue when the decision is made to transfer a downstream message, wherein all downstream messages include downstream messages placed on the downstream queue during the transfer of downstream messages from the downstream queue to the I/O adapter, wherein decision logic in said I/O adapter checks the downstream queue system address register for a change in value during the transfer to ensure that all downstream messages are transferred.

* * * * *